G. J. BURNS.
GUARD ATTACHMENT FOR TROLLEYS.
APPLICATION FILED AUG. 17, 1910.
998,674.
Patented July 25, 1911.
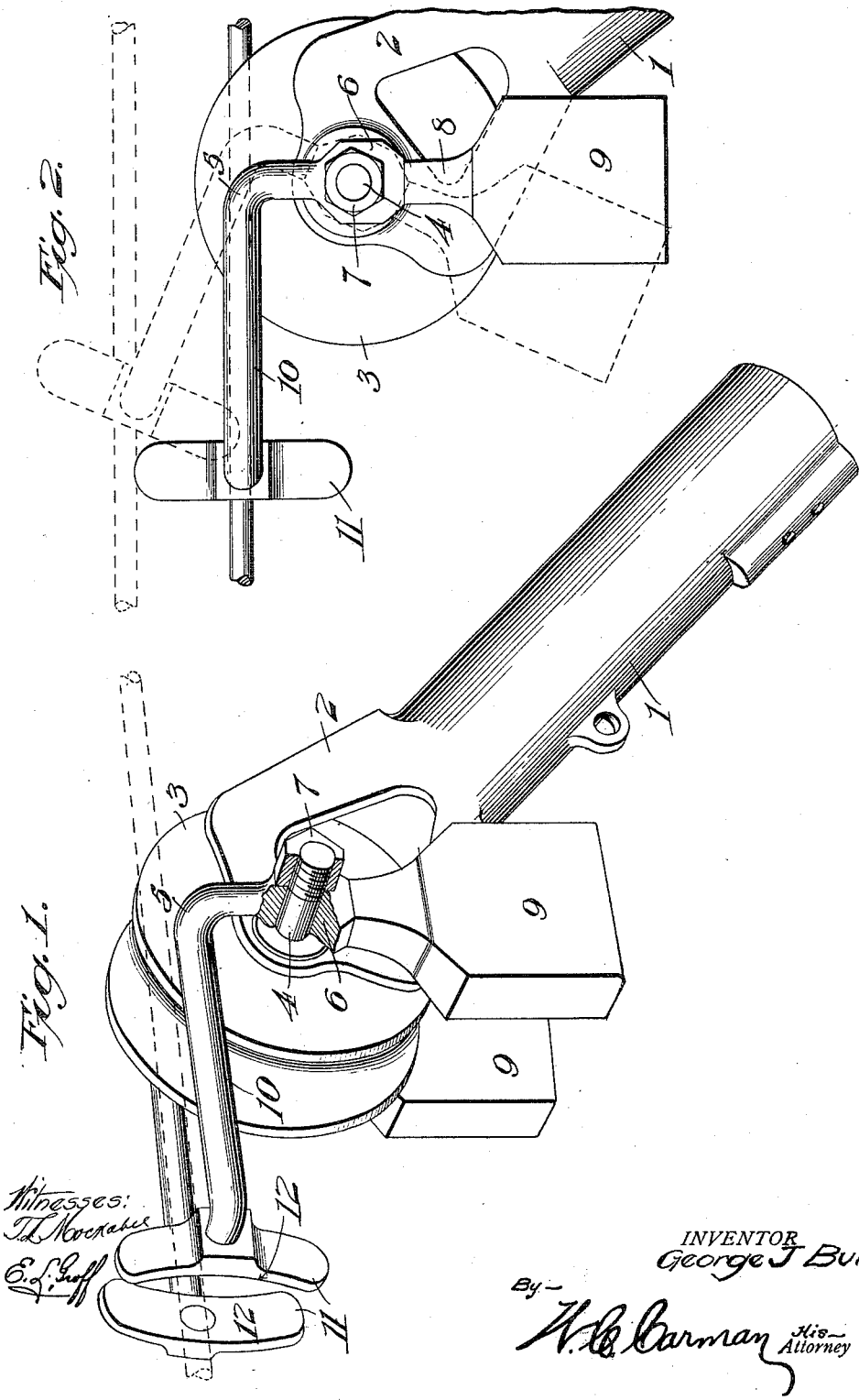
INVENTOR
George J. Burns,

UNITED STATES PATENT OFFICE.

GEORGE J. BURNS, OF YOUNGSTOWN, OHIO.

GUARD ATTACHMENT FOR TROLLEYS.

998,674. Specification of Letters Patent. Patented July 25, 1911.

Application filed August 17, 1910. Serial No. 577,639.

*To all whom it may concern:*

Be it known that I, GEORGE J. BURNS, a citizen of the United States, residing at Youngstown, in the county of Mahoning and State of Ohio, have invented certain new and useful Improvements in Guard Attachments for Trolleys, of which the following is a specification.

This invention relates to the subject of trolleys for electric railways, and more particularly to the means employed for safeguarding the engagement of the trolley wheel with the electrical conductor or trolley wire.

To this end the invention primarily has in view a simple, practical and thoroughly reliable guard attachment for trolleys associated with the trolley-harp and wheel, and comprising means for automatically securing a reëngagement of the trolley wheel with the wire in the event of the wheel leaving the wire, or vice versa, as frequently occurs in the every-day trolley service.

A distinctive object of the present invention is to provide a form of guard attachment for trolleys that distinguishes from many types of trolley "catchers" or "finders" in the particular of maintaining what may be termed a holding engagement or connection between the trolley wire and the trolley pole or harp until a displaced wire has become reseated in the groove of the wheel.

With these and other objects in view, which will more fully appear as the details of the invention are better understood, the same consists in the novel construction, combination and arrangement of parts hereinafter more fully described, illustrated and claimed.

The preferred and practical embodiment of the invention is shown in the accompanying drawings, in which—

Figure 1 is a perspective view of a guard attachment for trolleys shown in applied position to a trolley, and illustrating the latter under normal conditions with the wheel engaged with the wire. Fig. 2 is a side elevation of the same, but illustrating by dotted lines the trolley wire displaced from the wheel, and the guard attachment maintaining its holding engagement or connection with the displaced wire.

Like references indicate corresponding parts in all the figures of the drawing.

In carrying out the present invention no change is required in the usual trolley equipment, so for the purposes of illustration there is shown in the drawings a trolley pole 1 provided with the usual harp or wheel-carrier 2, within which is mounted the peripherally-grooved trolley wheel 3, which wheel is supported upon the axle 4.

The guard attachment which comprises the invention claimed herein consists of a pair of duplicate, but oppositely arranged, rocking angle-levers 5. These angle-levers 5 are respectively arranged upon opposite sides of the trolley-harp and wheel, and are pivotally hung as at 6 upon the opposite end portions of the wheel axle or spindle. In this connection it will be observed that in order to obtain the best pendulum effect the angle-levers 5 are preferably formed below their angles, and at the points 6 with bearing collar-portions which constitute the bearing or pivotal points for the said levers, and as a matter of convenience the angle-levers may be detachably held in their pivotally supported positions by means of nuts or equivalent retainers 7 at the extremities of the axle. By reason of their angle formation, each rocking angle-lever 5 is provided with a depending pendulum-arm 8, carrying at its lower end a centering weight 9, and in addition to the depending arm 8 each angle-lever includes a normally approximately horizontal and vertically swinging guard arm 10, which has fitted to its free end an upstanding retaining cross-bar 11. The retaining bar 11 of each angle-lever is preferably curved longitudinally, or in the direction of its length, to provide a concaved or dished inner side 12 which is engaged by the displaced trolley wire.

With the parts in the normal position, as shown in Fig. 1 of the drawings, the angle-levers are so hung and are so held by their weights 9 that the retaining bars 11 are held centered, respectively, upon opposite sides of the trolley wire, which therefore lies between said bars, and in the groove of the trolley wheel 3. However, upon a disengagement of the trolley wire from the wheel, the consequent disalinement of the wheel with the trolley wire causes the latter to come into firm holding engagement with one of the upstanding retaining bars 11. This engagement is sufficiently firm to permit of the retaining bar following the wire up and down after it leaves the trolley wheel, and to maintain mechanical and electrical-conducting connection with the wire until such time as the latter again comes into alinement with the wheel, so that it will reseat itself. In this operation the weighted pendulum-arm 8 is exerting a constant tendency to bring the wire and wheel into realinement, and when that occurs the previously active retaining bar resumes its normal position behind and in a horizontal plane with the groove in the trolley wheel.

I claim,—

1. In a guard attachment for trolleys, the combination with a trolley-wheel support, of a pair of angle-levers pivotally hung upon opposite sides of said support, and each of which is provided with a depending weighted pendulum arm, and an approximately horizontal rearwardly extending guard arm having at its free end a vertically disposed retaining bar formed at its inner side with a seat for engagement by the displaced trolley wire, the oppositely located retaining bars being so arranged that when the trolley leaves the wire the latter will come into holding engagement with one of the said bars.

2. In a guard attachment for trolleys, the combination with the trolley wheel support, of a pair of angle levers pivotally hung, at points below their angles, upon opposite sides of said support, each of said angle levers having a depending weighted pendulum arm and an approximately horizontal vertically swinging guard arm provided at its free end with a vertically disposed retaining bar having a dished inner side, the oppositely located retaining bars being so arranged that when the trolley leaves the wire the latter will come into holding engagement with one of the bars.

In testimony whereof I hereunto affix my signature in the presence of two witnesses.

GEORGE J. BURNS.

Witnesses:
SADIE M. GREEN,
J. P. HUXLEY.

Copies of this patent may be obtained for five cents each, by addressing the "Commissioner of Patents, Washington, D. C."